(12) United States Patent
Williams

(10) Patent No.: US 8,708,081 B1
(45) Date of Patent: Apr. 29, 2014

(54) CONTINUOUSLY VARIABLE TRANSMISSION COUPLED FLYWHEEL FOR ENERGY RECYCLING AND CYCLIC LOAD SYSTEMS

(76) Inventor: Kevin Williams, Cypress, TX (US)

( * ) Notice: Subject to any disclaimer, the term of this patent is extended or adjusted under 35 U.S.C. 154(b) by 1068 days.

(21) Appl. No.: 11/441,260

(22) Filed: May 25, 2006

Related U.S. Application Data

(60) Provisional application No. 60/685,505, filed on May 27, 2005.

(51) Int. Cl.
*B60K 6/10* (2006.01)
(52) U.S. Cl.
USPC .......................................................... 180/165
(58) Field of Classification Search
USPC ................. 180/165, 65.1, 65.2; 74/572.1
See application file for complete search history.

(56) References Cited

U.S. PATENT DOCUMENTS

| | | | |
|---|---|---|---|
| 3,497,026 A * | 2/1970 | Calvert .......................... | 180/165 |
| 3,651,900 A * | 3/1972 | Feikema .................... | 188/181 T |
| 3,672,244 A * | 6/1972 | Nasvytis ......................... | 477/37 |
| 4,498,015 A | 2/1985 | Gottfried, Jr. | |
| 4,588,040 A * | 5/1986 | Albright et al. ............... | 180/165 |
| 4,625,823 A * | 12/1986 | Frank ............................ | 180/165 |
| 4,680,986 A * | 7/1987 | Elsner ............................. | 477/6 |
| 5,244,054 A * | 9/1993 | Parry ............................ | 180/165 |
| 5,568,023 A * | 10/1996 | Grayer et al. .................. | 318/139 |
| 5,767,595 A | 6/1998 | Rosen | |
| 6,232,671 B1 | 5/2001 | Gottfried, Jr. | |
| 6,286,635 B1 * | 9/2001 | Tamor .......................... | 188/72.3 |
| 6,819,012 B1 | 11/2004 | Gabrys | |
| 6,935,987 B1 * | 8/2005 | Booth, Jr. ......................... | 476/4 |
| 7,416,039 B1 * | 8/2008 | Anderson et al. ............. | 180/165 |

OTHER PUBLICATIONS

"Flywheel", Wikipedia article, pp. 1-6 (http://en.wikipedia.org/wiki/Flywheel).*
"Transmission (mechanics)", Wikipedia article, pp. 1-10 (http://en.wikipedia.org/wiki/Transmission_(mechanics)).*

* cited by examiner

*Primary Examiner* — Frank Vanaman
(74) *Attorney, Agent, or Firm* — Egbert Law Offices, PLLC

(57) ABSTRACT

An apparatus for recycling energy in a mechanical system has a variable-speed flywheel, a main mechanical load, and a continuously variable transmission coupled between the flywheel and the load. The continuously variable transmission accelerates the flywheel when the load decelerates and decelerates the flywheel when the load accelerates. A clutch is cooperative between the continuously variable transmission and the load. The load is a motor vehicle having a prime mover and a brake. A load shaft is connected between the motor vehicle and the transmission. A flywheel shaft is connected between the flywheel and the transmission.

2 Claims, 1 Drawing Sheet

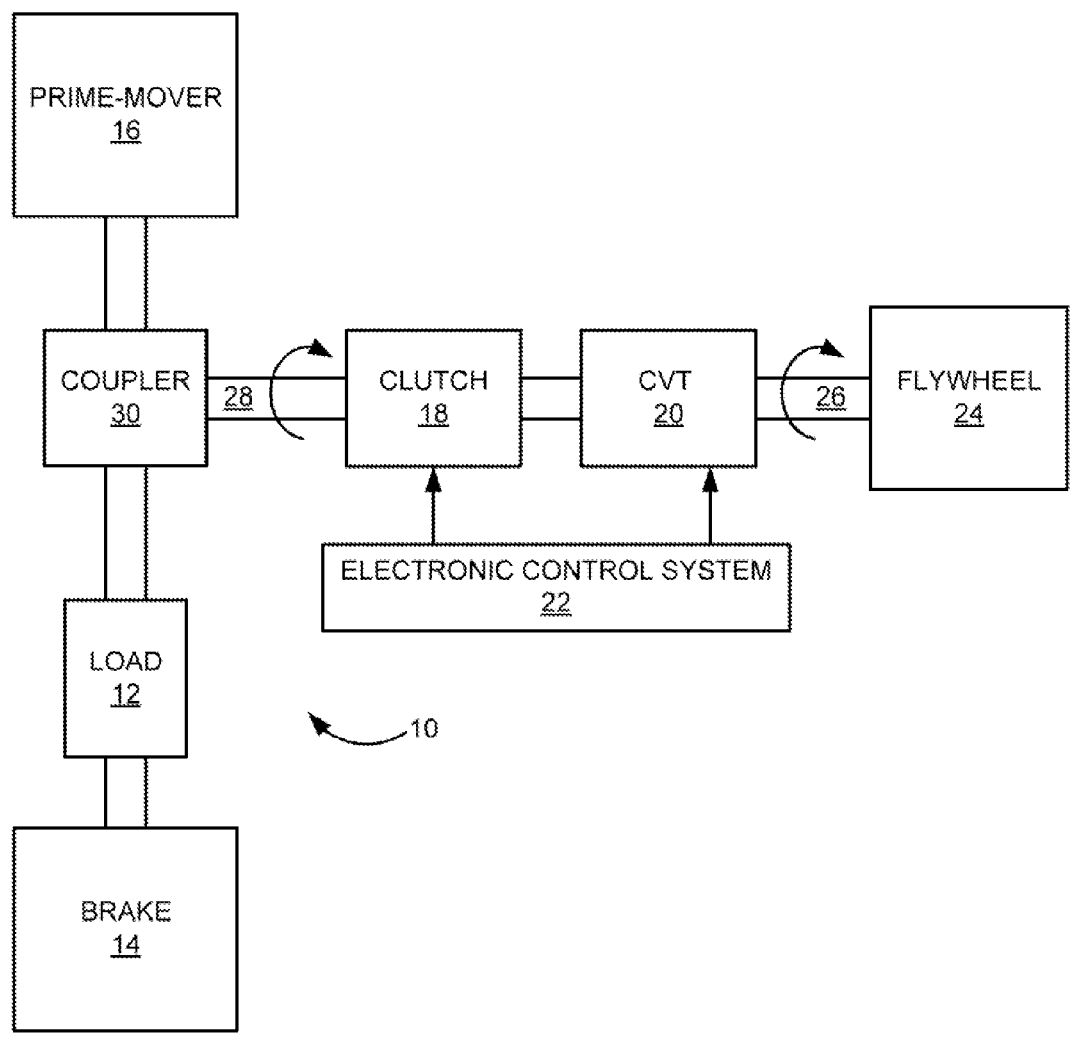

CONTINUOUSLY VARIABLE TRANSMISSION COUPLED FLYWHEEL FOR ENERGY RECYCLING AND CYCLIC LOAD SYSTEMS

RELATED U.S. APPLICATIONS

The present application claims priority from U.S. Provisional Patent Application Ser. No. 60/685,505, filed on May 27, 2005, and entitled "Continuously Variable Transmission Coupled Flywheel for Energy Recycling and Cyclic Load Systems".

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to flywheel systems which receive kinetic energy for storage and can transmit the kinetic energy for use. Additionally, the present invention relates to flywheel energy systems which provide a technique for recycling energy in mechanical systems where the load characteristic is a cyclic, bi-directional power flow. More particularly, the present invention relates to the use of flywheel energy systems in combination with the prime mover and the braking system of an automobile.

BACKGROUND OF THE INVENTION

While flywheels are well known in the art, there is very little application of flywheels to moving vehicles. Some flywheels have been used in automobile engines to smooth out the pulses of energy provided by the exploding gases in the cylinders and to provide energy for the compression stroke of the pistons. However, flywheels have not been used for the storage of kinetic energy within the automobile.

It would be highly desirable to utilize flywheel system to store kinetic energy in moving vehicles so that they can be loaded and energy drawn many times. For example, a train equipped with a kinetic energy storing flywheel could conserve a significant portion of that energy which is lost upon stopping the train. Similarly, the energy wasted in stopping an automobile can also be conserved and applied in accelerating the automobile or supplying the automobile with electrical power. Such a kinetic energy system could have vast application in the field of electric automobiles or other electrically powered vehicles.

In the past, various patents have issued relating to such flywheel energy storage systems. For example, U.S. Pat. No. 4,498,015, issued on Feb. 5, 1985 to M. Gottfried, Jr., describes a flywheel device for a moving vehicle that includes a plurality of flywheel systems connected in such a manner as to minimize the gyroscopic effects of the flywheels. The flywheels are arranged such that they spin in axes that are 90° from each other. Each flywheel is connected to a separate shaft extending through opposite sides of a closed container. Each of the shafts is freely rotatable within a ball bearing arrangement mounted on each of side of the enclosure. The shafts are geared to one another such that the equally-sized flywheels will spin at the same rate. Each of the flywheels is a rotor of an electric motor.

U.S. Pat. No. 6,232,671, issued on May 15, 2001 to M. Gottfried, Jr., also describes an energy storage apparatus for a vehicle having a housing resiliently mounted in the vehicle, a first plurality of flywheels rotatable about a first axis within the housing, a second plurality of flywheels rotatable about a second axis within the housing, a third plurality of flywheels rotatable about a third axis within the housing, an energy input mechanism connected to at least one of the flywheels for initiating and maintaining rotational movement of the flywheels, and an output mechanism for converting the rotation of the flywheels into potential energy. Each of the flywheels is rotatable in opposite directions. The axes of each of flywheels systems are perpendicular to each other. A' cradle is connected to the vehicle so as to receive the housing within the vehicle.

U.S. Pat. No. 6,819,012, issued on Nov. 16, 2004 to C. W. Gabrys, describes a flywheel energy storage system which has an energy storage flywheel supported in a low pressure containment vessel for rotation on a bearing system. A brushless motor/generator is coupled to the flywheel for accelerating and decelerating the flywheel for storing and retrieving energy. The flywheel is rotated in normal operation at a speed such that the generator voltage is higher than the output voltage. The flywheel's power supply efficiently maintains power to an electrical load during an interruption of primary power by supplying power generated from the flywheel's generator.

U.S. Pat. No. 5,767,595, issued on Jun. 16, 1998 to H. A. Rosen, provides a flywheel support system that isolates the flywheel and its motor-generator from the driving environment of an electrically-powered motor vehicle. During normal operation, a mechanical gimbal system keeps the vacuum housing centered in the outer housing, reacts the spin moments generated by the motor-generator, and provides a path for the electrical leads into the vacuum housing. A suitable liquid is placed between the outer and vacuum housings of the flywheel assembly to provide buoyancy and damping to the vacuum housing, cooling the motor-generator, and serving as one of the barriers to rotor energy and angular momentum transfer in the event of an accident or failure.

It is an object of the present invention to provide a flywheel system which allows for the transfer of kinetic energy in mechanical systems that have bi-directional power flows.

It is an object of the present invention to provide a flywheel energy system connected to a vehicle which stores energy during the braking phase of the vehicle and reuses the energy during the acceleration phase of the vehicle.

It is another object of the present invention to provide a flywheel energy system which avoids the wasting of energy consumption in the operation of a mechanical system.

It is still a further object of the present invention to provide a flywheel system which serves to minimize fuel consumption and/or energy storage requirements by the mechanical system.

It is still a further object of the present invention to provide a flywheel system that can be used in association with cranes, hoists and swell compensators in drilling vessels.

These and other objects and advantages of the present invention will become apparent from a reading of the attached specification and appended claims.

BRIEF SUMMARY OF THE INVENTION

The present invention provides a method and apparatus for recycling energy in mechanical systems whose load characteristic is a cyclic, bi-directional power flow. The present invention utilizes a variable-speed flywheel that is coupled to the main mechanical load by a continuously variable transmission and a clutch. As a result, the system of the present invention can store energy during the braking phase of the load and can reuse this energy during the acceleration phase.

In the preferred embodiment of the present invention, the load can be a motor vehicle. In particular, the load can be the combination of the prime mover of the motor vehicle body and the braking system of the vehicle. The prime mover is typically a gasoline engine and its associated gear box. In other embodiments of the present invention, the prime mover can be the electrical motors associated an electrical vehicle or a hybrid vehicle. The load of a vehicle body is accelerated through the use of the prime mover. The vehicle body can include the interior and exterior components of the vehicle. The braking system is applied to the wheels of the vehicle so to decelerate the vehicle. Conventionally, the prime mover will be coupled to the load of the vehicle through a mechanical coupling system, such as belt. The gear box is utilized so as to transfer energy, in a desired manner, between the prime mover and the wheels of the vehicle.

The load of the vehicle is connected to an electronically-controlled clutch and to a continuously variable transmission. An electronic control system is cooperative with the clutch and the continuously variable transmission so as to adjust the transmission relative to the speed and/or acceleration of the vehicle. As a result, any energy that is stored in the flywheel can be transferred by the continuously variable transmission back to the load. Similarly, any excessive loads are transferred by the continuously variable transmission to the flywheel system. As a result, the flywheel system enhances the storage of kinetic energy within the vehicle.

The flywheel is a continuously variable speed flywheel. The flywheel will serve to store energy during braking and will use energy during acceleration. There is a 2:1 ratio of flywheel maximum speed to flywheel minimum speed. In order to avoid gyroscopic effects, contra-rotating double flywheels can be utilized.

In the method of the present invention, as the engine of the vehicles accelerates the load, the ratio of the continuously variable transmission is maintained at a maximum until the flywheel minimum speed is reached. As acceleration continues, the ratio of the continuously variable transmission is adjusted to maintain the flywheel speed at the minimum value. When the deceleration of the load is required, the ratio of the continuously variable transmission is adjusted to produce acceleration of the flywheel. This causes a braking torque on the load so as to assist the braking operation of the vehicle. The limiting ratios of the continuously variable transmission are sufficiently wide to operate such that maximum load speed corresponds to the minimum flywheel speed.

BRIEF DESCRIPTION OF THE SEVERAL VIEWS OF THE DRAWINGS

The schematic illustration shows the flywheel energy system in accordance with the preferred embodiment of the present invention.

DETAILED DESCRIPTION OF THE INVENTION

Referring to the schematic illustration, there is shown the flywheel energy system 10 in accordance with the preferred embodiment of the present invention. The flywheel energy system 10 includes a load 12 that is connected to braking system 14 and interconnected to a prime mover 16. An electronically controlled clutch 18 is coupled to the load so as to rotationally receive the load therein. The electronically-controlled clutch 18 is similarly connected to a continuously variable transmission 20. The clutch 18 and the continuously variable transmission 20 are each responsive to an electronic control system 22 that is electrically connected therebetween so as to allow for the adjustment of both the clutch and the continuously variable transmission in relation to the load requirements or flywheel requirements of the system. A flywheel 24 is rotationally coupled to the continuously variable transmission 20 by shaft 26. The rotation of flywheel 24 can serve to transfer energy to continuously variable transmission 20 or to receive energy by way of the continuously variable transmission 20 from the shaft 28 connected to the load 12.

The preferred embodiment of the present invention is a vehicle. This vehicle can be a car, truck, train or other mode of transportation. The load will be the vehicle body and the associated components of the vehicle. As usual, the vehicle will traverse the earth through use of wheels. The deceleration of the wheels is controlled by a traditional "lossy" brake system 14. The prime mover 16 is in the form of a gasoline engine and associated gear box. The prime mover 16 can be operated so as to accelerate the vehicle to a desired speed. As the engine speed increases, the gear box associated therewith can be suitably manipulated so that a desired speed can be achieved through a desired acceleration process. Conventionally, the prime mover 16 is coupled by a mechanical coupling 30 to the load and to the shaft 28. As such, the mechanical coupling will rotate the shaft 28 that is connected to the clutch 18. The mechanical coupling 30 can be in the form of a belt that establishes a 1:1 ratio with the load.

The clutch 18 is electronically controlled. If the speed of the load shaft 28 is minimum, then the clutch 18 will serve to de-clutch the flywheel 24 so as to save any stored energy. If the speed of the load 28 is maximum, then the clutch 18 will operate to engage the shaft 28 with the shaft 26 so as to transfer energy from the shaft 28 to the shaft 26 and, hence, the flywheel 24. The continuously variable transmission 20 will optimize the transfer of energy between the flywheel 24 and the load shaft 28 in accordance with predetermined demands. The electronic control system 22 can provide information to the operator of the vehicle as to the application of energy by the flywheel to the braking system 14 and it can also serve to control the operation of the continuously variable transmission 20 and the clutch 18.

The flywheel 24 is connected to the vehicle in a suitable position so as to store energy during braking and to use energy during acceleration. The flywheel 24 is a high-inertia flywheel. So as to avoid gyroscopic effects, the flywheel 24 can be contra-rotating double flywheel. The flywheel 24 can have a 2:1 ratio of flywheel maximum speed to flywheel minimum speed.

The system 10 of the present invention serves to store the returned energy by accelerating the flywheel 24 by changing the ratio of the continuously variable transmission 20 that couples the flywheel 24 to the load shaft 28. This will produce the required braking torque to decelerate the load 12 while accelerating the flywheel 24. When energy is again required by the load 12, the flywheel 24 will be decelerated by way of the continuously variable transmission 20 and the energy is returned to the load shaft 28.

For the basics of operation it should be noted that the following definitions will apply. First:

$$\omega_{fly} = \omega_{load} \cdot R$$

Where the ratio of the continuously variable transmission 20, R, can be varied smoothly from $R_{min}$ to $R_{max}$ at a sufficiently high rate to fulfill the operating cycle requirements. The energy stored in the flywheel at any time is:

$$E_{fly}=1/2J_{fly}\omega_{fly}^2$$

The power flow into or out of flywheel 24 is given by the time derivative of the energy storage formula. Assuming the continuously variable transmission 20, along with other coupling, have a maximum torque capability of $T_{max}$. This gives a maximum power flow proportional to the speed of the flywheel 24. The limiting ratios of the continuously variable transmission 20 are sufficiently wide so as to allow operation such that the maximum load corresponds to the minimum flywheel speed and such that the minimum load speed corresponds to the maximum flywheel speed. Typically, the operation of the system 10 is accordance with a 2:1 ratio of flywheel maximum speed to flywheel minimum speed.

As the load 12 is accelerated from rest by the prime mover 16, the ratio of the continuously variable transmission 20 is maintained at $R_{max}$ until the minimum speed of the flywheel 24 is reached. Thereafter, as acceleration continues, R is adjusted to maintain the speed of the flywheel 24 at the minimum value. This is an initial "pre-charge" phase of operation for accelerating the flywheel 24 to a speed where it is able to absorb adequate power from the load shaft 28. When deceleration of the load 12 is required, the ratio the continuously variable transmission 20 is adjusted to produce acceleration of the flywheel 24. This results in a braking torque on the load 12 and can be used so as to be in assist to the braking system 14. If the speed of the load reaches its minimum for operation of the continuously variable transmission 20, the flywheel shaft 26 and the flywheel 24 (i.e. the maximum speed for the flywheel 24), the flywheel 24 is de-clutched so as to save the stored energy in the flywheel 24. When acceleration of the load 12 is required, R is adjusted to decelerate the flywheel 24 so as to produce torque in the required direction.

It is important to note that if the flywheel 24 had been de-clutched due to the speed of the load shaft 28 dropping below the value of the corresponds to the maximum speed for the flywheel 24, the flywheel can be re-clutched at the point the load speed synchronous with the flywheel speed. The flywheel 24 has "spun down" to rest, the flywheel 24 can be re-clutched (with a torque across the clutch 18), or waiting until the load shaft 28 comes to rest and then precharging the flywheel 24 again. It is desired to operate the load above the maximum speed that the flywheel 24 can handle at the minimum continuously variable transmission ratio, the flywheel 24 can be de-clutched and re-clutched as the load speed decelerates past the synchronous speed of the flywheel 24.

In the present invention, the energy returned from the load during the deceleration phase would otherwise have to be dissipated in the local environment in the form of heat in the disk brakes of a car or the braking resistors of the electrical drive. This can be a problem in many applications where the heat cannot be easily accommodated. Under these circumstances, the energy returned from the load is wasted so as to cause energy consumption to be much higher than it needs to be. This can result in increased fuel consumption. By absorbing the energy in the flywheel system, this waste of fuel and energy is avoided. Additionally, the problem associated with heat dissipation is also avoided since the kinetic energy is stored in the flywheel and transferred by the flywheel as torque to the braking system. The present invention is also applicable to cranes and hoists. The present invention can also be used in association with swell compensation and drilling vessels. The present invention further can be used in association with various types of elevators and non-electric hybrid vehicles.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for recycling energy in a mechanical system comprising:
    a variable-speed flywheel having a minimum speed, said flywheel being a contra-rotating double flywheel;
    a main mechanical load comprising a motor vehicle having a prime mover and a brake, said brake being directly connected to said main mechanical load;
    a continuously variable transmission interconnected between said variable-speed flywheel and said main mechanical load, said continuously variable transmission having a ratio, said ratio being maintained at a maximum value as said main mechanical load accelerates from rest and until said variable-speed flywheel accelerates to said minimum speed, said ratio of said continuously variable transmission changing after said variable-speed flywheel reaches said minimum speed so as to maintain a speed of said variable-speed flywheel at a minimum value;
    a clutch coupled to said main mechanical load, said clutch being positioned between said continuously variable transmission and said main mechanical load;
    a coupler connected to said main mechanical load, said clutch positioned between said coupler and said continuously variable transmission;
    a flywheel shaft directly connected to said variable-speed flywheel, said continuously variable transmission being directly connected to said flywheel shaft;
    a load shaft interconnected to said main mechanical load, said load shaft being directly connected to said clutch; and
    an electronic controller means connected to said continuously variable transmission and to said clutch, said electronic controller means for actuating said continuously variable transmission and said clutch relative to an acceleration and a deceleration of said main mechanical load and relative to said speed of said flywheel.

2. A system for recycling energy comprising:
    a motor vehicle having a main mechanical load and a prime mover;
    a brake connected to said main mechanical load;
    a variable-speed flywheel having a minimum speed, and a maximum speed, said maximum speed and said minimum speed having a ratio of approximately 2:1, said flywheel being a contra-rotating flywheel;
    a continuously variable transmission coupled to said prime mover, said continuously variable transmission having a ratio, said ratio being maintained at a maximum value as said main mechanical load accelerates from rest and until said variable-speed flywheel accelerates to said minimum speed, said ratio of said continuously variable transmission changing after said variable-speed flywheel reaches said minimum speed so as to maintain a speed of said variable-speed flywheel at a minimum value;
    a load shaft interconnected to said main mechanical load;
    a coupler shaft directly connected to said main mechanical load;

a coupler connected to said prime mover, said coupler directly connected to said load shaft and to said coupler shaft, said coupler connected to a side of said main mechanical load opposite said brake, said brake being interconnected to said continuously variable transmission so as to accelerate said flywheel when said brake is applied to decelerate said motor vehicle, said prime mover being interconnected to said continuously variable transmission so as to decelerate said flywheel when said prime mover accelerates said motor vehicle;

a clutch connected to said continuously variable transmission and connected directly to said load shaft;

a flywheel shaft directly connected to said flywheel and to said continuously variable transmission;

a prime mover shaft directly connected to said prime mover and to said coupler;

an electronic controller means coupled to said continuously variable transmission and to said clutch, said electronic controller means for actuating said continuously variable transmission and said clutch relative to an acceleration and a deceleration of said motor vehicle and relative to said speed of said flywheel.

* * * * *